US006237294B1

(12) United States Patent  (10) Patent No.: US 6,237,294 B1
Rygiel                    (45) Date of Patent: *May 29, 2001

(54) DECORATIVE THREE DIMENSIONAL PANELS AND METHOD OF PRODUCING THE SAME (76) Inventor: Antoni Rygiel, 871 Mosley St., Wasaga Beach (CA), L0L 2P0

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/855,281
(22) Filed: May 13, 1997

(30) Foreign Application Priority Data

Apr. 25, 1997 (CA) .................................................... 2203720

(51) Int. Cl.⁷ ............................... E04F 13/00; E04C 2/00
(52) U.S. Cl. ........................... 52/314; 52/311.3; 52/315; 52/747.12; 428/195; 428/703; 264/220
(58) Field of Search ................................. 428/44, 49, 68, 428/703, 195; 52/314, 311.3, 746.1, 747.12, 315, 506.05; 264/31, 33, 220

(56) References Cited

U.S. PATENT DOCUMENTS 3,177,279 * 4/1965 Bilodeau ............................. 264/255
3,496,694 * 2/1970 Hicks et al. ........................... 52/746
3,882,218 * 5/1975 Bixel, Jr. .............................. 264/157
3,968,610 * 7/1976 Medow .................................. 52/314
3,974,024 * 8/1976 Yano et al. ........................... 162/101
4,017,658 * 4/1977 Bomboire ............................. 428/172
4,052,831 * 10/1977 Roberts et al. ..................... 52/309.8
4,094,941 * 6/1978 Manners et al. ....................... 264/71
4,148,781 * 4/1979 Narukawa et al. ................ 260/42.51
4,644,719 * 2/1987 Salazar ................................... 52/311

FOREIGN PATENT DOCUMENTS

1101687 * 5/1981 (CA) .

* cited by examiner

Primary Examiner—Deborah Jones
Assistant Examiner—Stephen Stein
(74) Attorney, Agent, or Firm—Baker Botts L.L.P.

(57) ABSTRACT

The present invention relates to flexible decorative panels which simulate the appearance of natural materials such as brick, logs, wood planks, stone, masonry work, millwork, woodwork, etc., in addition to methods and kits for their preparation. The panels comprise a flexible building sheet, reinforced with a light fibrous material, fabricated by: filling a mold comprising a pattern of a natural material in relief with a fluent hardening material; submerging a reinforcing means within the hardening material; brushing the surface of hardening material; and de-molding the hardened panel.

8 Claims, 9 Drawing Sheets

DECORATIVE THREE DIMENSIONAL PANELS AND METHOD OF PRODUCING THE SAME

FIELD OF THE INVENTION

The present invention relates to decorative panels and methods of producing the same.

BACKGROUND OF THE INVENTION

Natural materials such as brick, stone, marble, or wood are often used to decorate walls due to the unique and inherent beauty of the finished product. Since no two bricks or stones look exactly the same, each wall comprising these components will also be unique, which is part of the artistic beauty of these types of decorating materials. The "earthy" look of brick with wood beams, for example, can render an interior warm and interesting. Moreover, these types of materials also serve the function of providing temperature insulation. Unfortunately, cost and/or engineering limitations prevent these types of decorating materials from being affordable to many.

Although attempts have been made to replicate the effect of natural materials, using low cost materials such as wood panelling, these design and function attributes are mostly lost with most synthetic wall coverings. The representative materials thus far available include wallpapers based upon woven fabrics, nonwoven fabrics, converted paper, and the like as well as predecorated plywood products and wood paneling.

Oftentimes synthetic materials require that a trade-off must be made between form and function. For example, interior decorating materials should be noncombustible. While gypsum boards, asbestos boards, slates, and the like satisfy the nonflammability requirement, these materials are by no means considered to be decorative interior materials.

There are different strategies in the prior art used to simulate the natural appearance of brick, stone, or other mortar and sand based products such as stucco. The most familiar interior decorating elements are wallpapers which can be manufactured from woven fabrics, non-woven fabrics and converted paper in such a manner as to impart a relief or printed pattern. Other familiar products include pre-decorated plywood products or other forms of wood based products. More complex methods of achieving simulated brick, range from synthetic copolymers and resins, to the piecemeal construction of composite brick-like pieces glued onto backing boards. Such methods are generally expensive to produce, are usually heavy. Furthermore, such methods require an elaborate process of manufacture which may include vibration, pressing and elaborate curing measures.

Apart from the decorative limitations, most artificial panels have the disadvantages of relatively high weight and poor insulating properties. They are susceptible to fracture if dropped or struck and they lack ductility in that slight bending stresses induce inappropriate cracking. Moreover, each of these synthetic strategies however, involve rigid, non-flexible surface coverings that greatly restrict ease of use and limit the surface contours to which they can be applied to linear planes. Materials such as wood paneling, pressed drywall, stucco panels, bricketts, etc., can only be applied to straight walls which eliminates their use on curved walls, thereby inducing limitations on the design or decor of the room or building.

Some examples of prior attempts to develop methods and strategies of simulating natural materials are disclosed in Canadian Patent 1,101,687 and U.S. Pat. Nos. 3,974,024; 4,017,658; 4,052,831; 3,968,610; 4,148,781; and 4,094,941.

One such technique is disclosed in Canadian Patent 1,101,687 wherein a mixture of pumice, cement, water and petroleum jelly is poured into a mold and onto which a layer of reinforcing steel is applied followed by another layer of the mixture, a second layer of reinforcing steel and a final layer of the mixture. This method requires that the steel members must run with their rigid axis perpendicular to each other; the mixture used must be vigorously churned for up to an hour, and between each pouring, while at all times keeping the mixture above 60° F. This method suffers from the disadvantage of producing a relatively heavy, thick and stiff panel that is not useful for widespread decorative application.

Another example of a process for simulating brick construction is disclosed in U.S. Pat. No. 4,094,941. The process involves: pouring a hardenable mixture into an open tray; inserting a grid used to outline the brick pattern, filling the grid to a flush level with a second hardenable mixture; using a male die positioned to fit snugly within the grid openings; and compressing both mixtures while at the same time vibrating the entire apparatus. Once set, the male die coupled with the grid is removed while vibration is continued to ease the separation. When the vibration is ended, the panel is allowed to cure fully, resulting in a rigid sheet-like panel representing the face of a mortar and brick construction. This method is restricted from wide-spread use due to its relatively complicated steps requiring specialized equipment for pressing and vibrating. The pattern of the resulting panels cannot be easily varied since a new mold and die set must be cast for each pattern. Finally, this method results and in a very rigid multi-ply panel.

U.S. Pat. No. 3,968,610, describes facing structures for building simulating brick, stone, shingle and the like consisting of prefabricated fiberglass panels designed to interlock, overlap and abut with each other. Fiberglass, however, is a toxic and difficult material to work with that requires extensive safety orientation and skill. The materials are environmentally unfriendly and the catalyst can render the production unpredictable. The finished product is rigid and can resemble plastic more than natural materials. Finally, paint does not adhere very well to the fiberglass surface and can chip and crack.

Due to these types of limitations a need remains in the field of decorative wall coverings that simulate natural materials and that are economical, flexible and easy to apply.

SUMMARY OF THE INVENTION

Accordingly, one object of the present invention is to provide a method of manufacture that does not require extensive machinery, time or materials to produce; the production steps are simple, economical and amenable to "do-it-yourself" kits; the method is flexible to allow for the design and production of panels realistically simulating almost any pattern of natural materials such as bricks, logs, stones, masonry works, etc.

Another object of the present invention is to provide a relatively lightweight decorative sheet material which is not intended to be a construction element or to have a load bearing function.

A further object of this invention is to provide a decorative sheet material that is flexible enough to accommodate a curved surface and having excellent workability, improved insulating and soundproofing qualities, as well as fire resistance and a long durable life.

Yet another object of the present invention is to provide a method for forming building panels that may be used to produce high volume quantities of panels either at the job site or in a studio designed for such purposes, that can also be expanded into more complex and even automated manufacturing systems for production at even higher volumes.

Another object of the invention is to provide a kit enabling the easy working of the method to produce decorative wall coverings in a number of contexts.

With these and other objects in view, the invention will be best understood from a consideration of the following detailed description taken in connection with the accompanying drawings. It is to be understood that the exemplary embodiments contained herein are illustrative and not restrictive. It will be obvious to those skilled in the art that modifications and changes may be made without departing from the true scope and spirit of the invention.

DETAILED DESCRIPTION OF THE INVENTION

Figure 1:
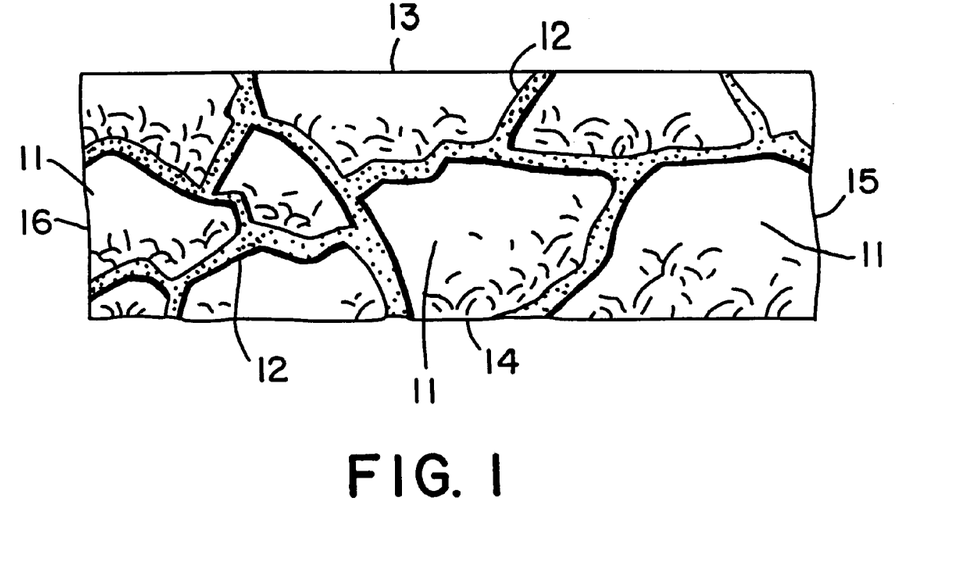
FIG. 1 is a front elevational view of one type of a panel, wherein its mold was designed to represent stonework.
Figure 2:
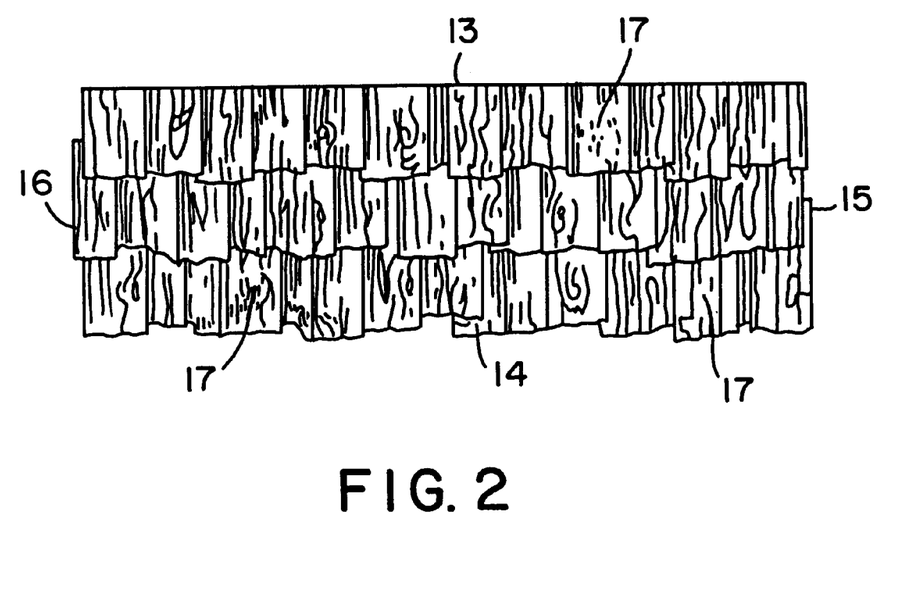
FIG. 2 is a front elevational view of another type of a panel, wherein its mold was designed to represent shingles.
Figure 3:
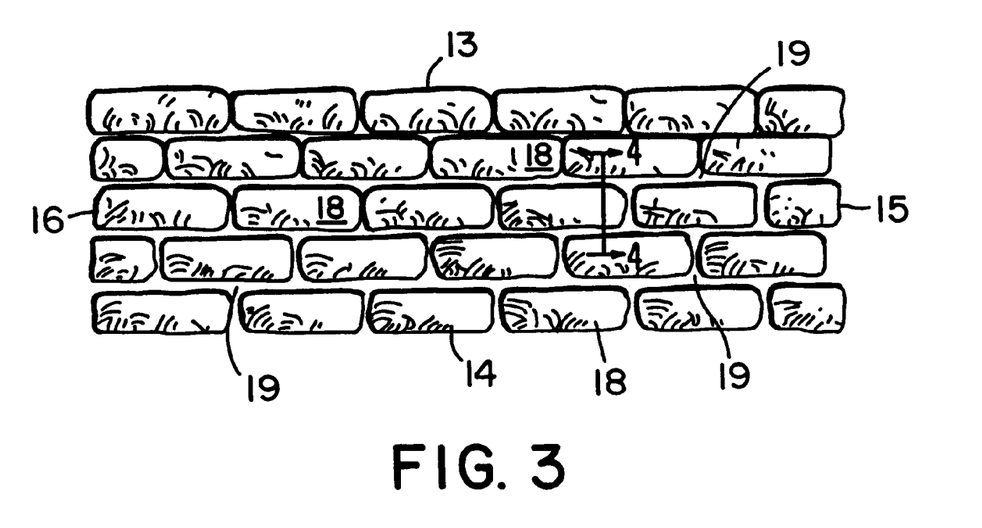
FIG. 3 is a front elevational view of another type of a panel, wherein its mold was designed to represent brick.

The types of panels that can be produced using this method can be appreciated from FIGS. 1 through 4 inclusive. Referring to the drawings wherein like numerals are used to designate similar parts throughout the several views and in particular, FIGS. 1 through 4 inclusive, the numeral 10 refers to a single panel constructed in accordance with the method of this invention and is explained in detail hereinafter when adhered to a wall 82 in engaged abutting and optionally interlocking relation with other like panels, the panels forming an enclosure for the wall. The panels 10 may or may not be identical in construction to one another, depending upon the desired outcome and design of the final network of panels. The panels 10 may be constructed to simulate irregular stonework, wooden shingles, or distressed brick as shown by FIGS. 1 through 3, or may be made to simulate some other natural material such as wood planks, logs, or other stone.

Each of the panels 10 are rectangular in shape having its raised portions shaped to simulate natural materials such as demonstrated in FIG. 1 wherein stone 11 and mortar lines 12 in coplanar relation with a top edge portion 13, bottom edge portion 14, and side edge portions 15 and 16. FIG. 2 illustrates how the panels 10 can be designed to simulate overlapping wooden shingles 17 with a top edge portion 13, bottom edge portion 14, and side edge portions 15 and 16.

Figure 4:
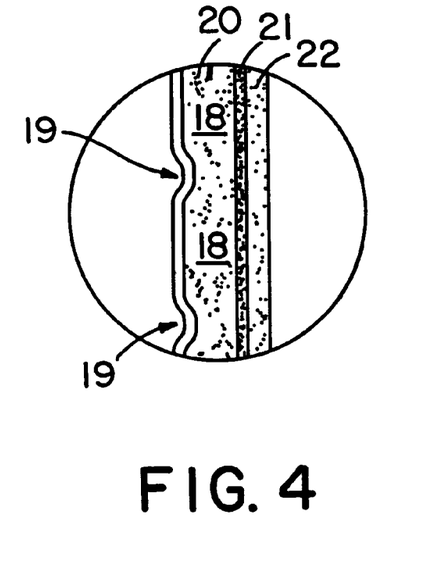
FIG. 4 is a cross-sectional view of a finished product cut vertically across FIG. 3 along line 4, illustrating the three layers and indentations of a simulated-brick type of panel.

FIGS. 3 and 4 illustrate one type of panel, in which the raised portions are shaped to simulate brick 18 and mortar lines 19 in coplanar relation with a top edge 13, bottom edge portion 14, and side edge portions 15 and 16, and further describes the three-dimensional qualities of the panels 10 and one way in which the panels can be installed to mask the points of juncture between panels mounted on a wall, The top edges 13 of these types of panels 10 are likewise made to simulate a mortar line, however, the free ends of these edge portions 13 and 14 can optionally be trimmed back to the upper edge 13 and/or the lower edge 14 of the brick 18 to allow for the union of another panel 10 in a vertically superior or vertically inferior and coplaner position. After mounting the panels to the wall, the space between the bricks 18 along the upper edge 13 of one panel and the bricks along the lower edge 14 of a superiorly and coplaner mounted panel 10 can be filled in with mortar to hide the junction between the two panels.

The dimensions of each panel can vary, depending upon the dimensions of the wall to be covered, the number of people working with each panel, the design of the relief, the types of hardenable material used. In general, dimensions will be chosen that are economical to make and install. The larger the panels, the less number of panels required to cover a wall surface, which diminishes the amount of work invested to mask seams. On the other hand, the panels can not be so large as to be unwieldy to manipulate and install, wherein they would be more likely crack. The height of each panel can range significantly, with a typical height being from 1 foot to 8 feet, and the height of preferred embodiments being on the order of 4 to 5 feet. The width can range significantly, with a typical width ranging from 2 to 14 feet The method of preparing the panels of this invention comprises five steps described in detail below: 1) preparing a mold; 2) preparing a hardenable mixture and either completely or partially filling the entire surface area of the mold with the hardenable mixture; 3) overlaying and/or submerging a reinforcing means over the entire area; 4) optionally pouring another layer of hardenable mixture over the reinforcing means and brushing the surface of the hardenable mixture; and 5) de-molding the finished panel.

Given the complexity of designs of the prior art, it is entirely surprising that such a simple method would produce an inexpensive, flexible decorative wall-covering that is amenable to almost any design of wall covering.

The hardening material may be poured in one step and the reinforcing means inserted into the middle, or two steps wherein the second layer is poured over the reinforcing means lying on the first surface, depending on the design of the application. Regardless of which procedure is used, however, in a preferred mode of the invention, the panel is considered as uni-layered with a reinforcing means running throughout. This feature is demonstrated in FIG. 4, where the reinforcing means 21 sits within the panel, nested within the material on the front side 20 and the same material on the backside 22. This embodiment is distinctive from the many multi-layered strategies of creating decorative panels such as press board or others such as U.S. Pat. Nos. 4,052,831; 3,974,024; 3,993,822; 4,647,496; and Canadian Patent No. 1,101,687. In another embodiment, the hardenable material on the front side 20 can be different from the hardenable material on the backside 22.

Referring to the figures, wherein like numerals are used to designate similar parts throughout the several views, the invention is described as follows.

The Mold

Referring now more specifically to FIGS. 1 through FIGS. 3, the simplicity of the mold renders tremendous freedom to the design of the finished panel; ease in production, virtually eliminates the need for transportation of finished product from the site of manufacture to the job site; enables wall-coverings to be placed on virtually any wall and reduces time and cost of production to an absolute minimum.

One desirable artistic feature of a wall constructed out of natural materials (stone, brick, or log) is the unique pattern of the finished product. Using natural materials, it is virtually impossible to create a pattern that is entirely repetitious in its fine detail. This design feature is lost with all other artificial coverings because the cost of producing the surface area warrants a repetitive design.

Apart from technical difficulties, the only limitations on the design are one's imagination. For example, if one wanted to design a theme room such as a cave, appropriate molds could be constructed to create panels with a cave-like relief. Alternatively, if a forest-room were the design objective, molds imitating the exterior bark of trees such as redwood trees, could be prepared; these molds would generate flexible panels that if wrapped around a curved structure attached to a wall, would appear like the base of giant trees. Different relief panels can be constructed simulating hyroglyphics caved in stone or interior castle walls. The stone panels can be placed around columns, pillars or support beams to simulate vertical supports made of stone. In contrast to typical pre-fabricated surface-covering options, the simplicity of the open mold enables freedom of design not found in other methods of manufacture for pre-fabricated wall coverings.

The design of the mold renders ease to the method of manufacture, in that the finished panels do not need to be transported from the site of manufacture to their final destination. The molds can be constructed on the job site, such that the panels can be poured, set, and hung all in the same room. The simplicity of the mold enables wall-coverings to be placed on virtually any wall because the molds can be set-up in any room. The constructors are not limited only to easy-to-access rooms or easy-to-cover walls.

Figure 5:
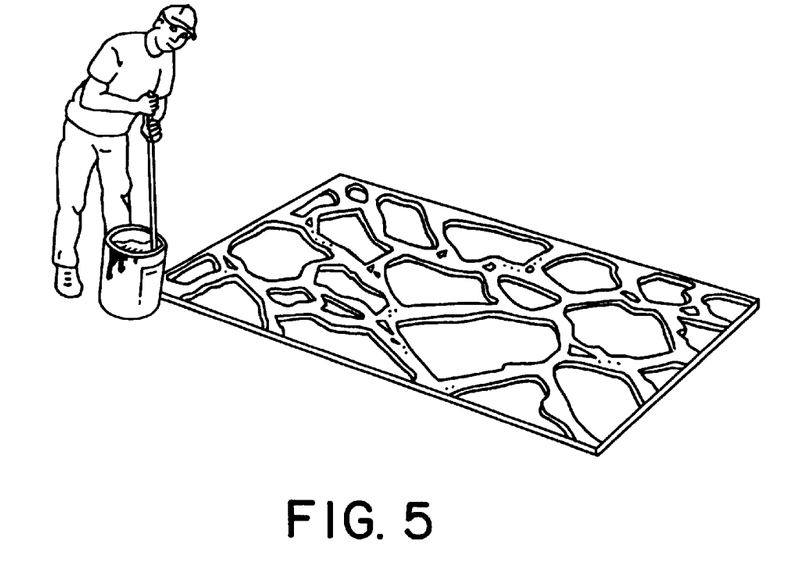
FIG. 5 is an elevational view of a mold for a stone-simulating panel and the preparation of mixing hardenable material for pouring into the mold.

The simplicity of the mold being a structure defining an upwardly open tray filled with a hardenable material as shown in FIG. 5, not requiring compression, vibration, or other treatment, significantly reduces time and cost of production to an absolute minimum.

In order to construct a panel, the first step entails designing a mold that reflects the desired final appearance of the panel as shown in FIG. 5. This may be simulated brick, simulated log construction, stone-work, masonry work or any other natural material as shown in FIGS. 1 to 3.

The process of making molds is well known to those skilled in the art and practically any type of mold may be used. The composition of the mold itself may encompass any or all of the following characteristics. It may be made from a high definition silicone rubber compound, or similar such material, having attributes which will allow one to achieve numerous high definition replications of the desired surface texture on the final product. It may be a vacuum formed or mold injected plastic, polymer or other synthetic material. Aluminum, steel, other metals, wood or composites thereof are also possible alternatives. The materials chosen will ultimately depend on the desired finished pattern and whether or not the pattern will be reproduced many times, i.e., the mold may be used for a single customized project or may be used for a large commercial production run. Prior to pouring, depending on the materials chosen, the mold cavity may be coated or treated with a parting agent to assist the de-molding process described below.

When making molds to be sold in the kit format, it may be desirable to construct the mold using non-durable materials that would render the mold functional for a creating a limited number of panels. For example, if the kit is designed for making brick-simulated panels for one accent wall (eg. for a living room or den), the mold can be constructed from a degradable material such as a very low grade polyvinyl chloride (PVC) or ABS plastic, on the order of 1 mm to 2 mm thick. This type of mold should produce about 8–10 panels, afterwhich it will become too brittle and flimsy to produce more panels.

The outer rim size of the mold may vary. Preferably 32 ft$^2$ to 36 ft$^2$ is a desirable size that is small enough that is easy to manipulate, yet large enough for speed of covering a wall. A kit-sized mold would preferably be on the order of 16 ft$^2$.

Figure 11:
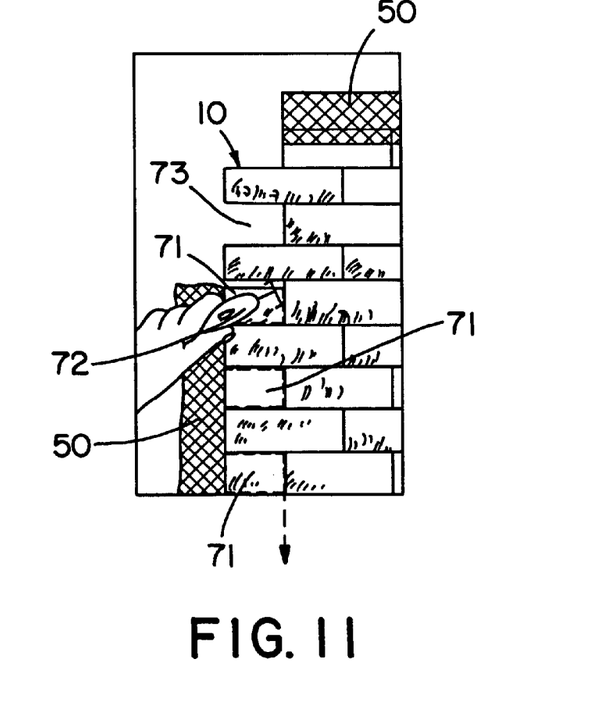
FIG. 11 is an elevational view of a corner of one type of simulated-brick panel illustrating one means of cutting out the half bricks, along the dotted line, such that the panels so that they interlock with one another.

In a preferred embodiment at least a four foot by four foot mold is prepared from a vacuum formed plastic which will impart an overall bold repetitive pattern, such as brick, with a subtle random appearance, i.e., each brick is not identical in appearance. The mold may be designed such that an interlocking pattern is conveyed to the sheet material so that it may be placed along side another sheet in an interlocking fashion. Alternatively, the mold may be square and the interlocking pattern can be easily carved out during installation with the use of a drywall knife as shown in FIG. 11. Once the mold has been completed, the cavity is cleaned of any debris and a release agent is applied. The release agent is preferably a wax, oil, or silicone based product.

The Hardening Material: Facing

Figure 6:
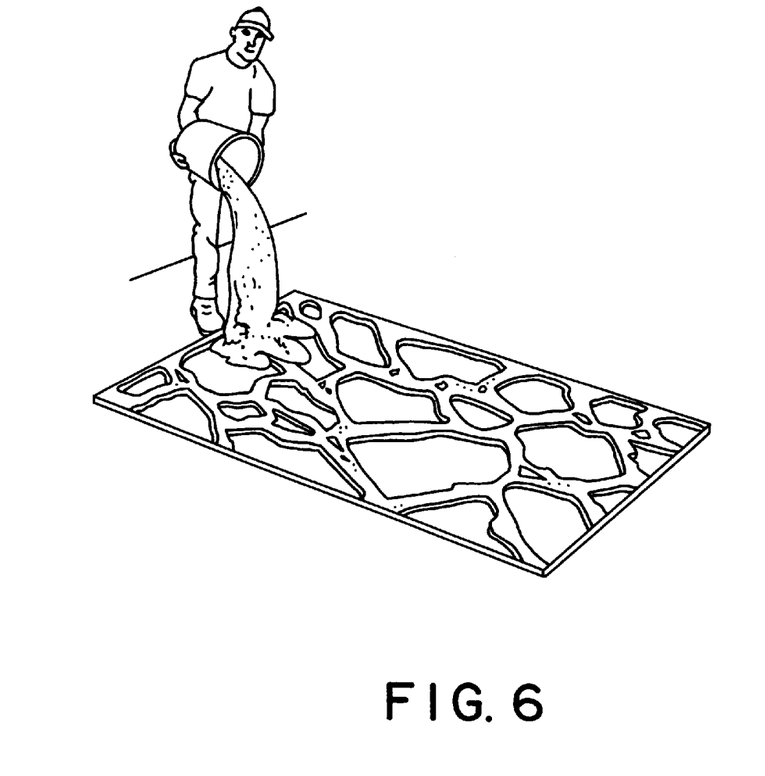
FIG. 6 depicts how a hardenable material can be poured into a mold.
Figure 7:
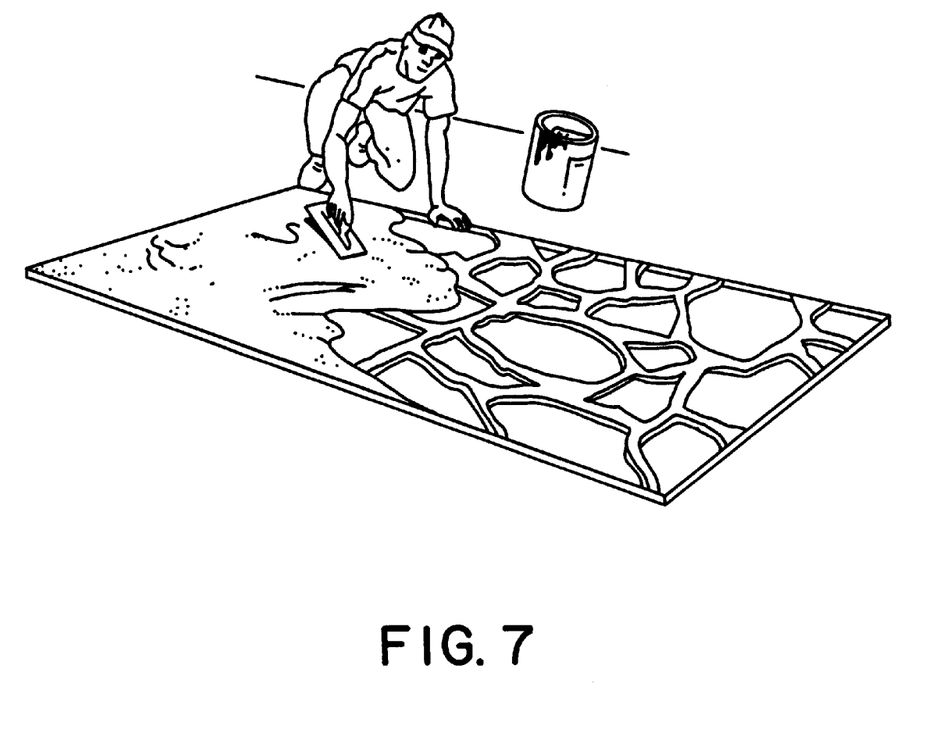
FIG. 7 demonstrates how a hardenable material can be spread during the pouring stage of the method.

A hardenable material is prepared and poured into the mold, as shown in FIGS. 5 to 7, to approximately two thirds of its volume in order to become the facing material once set. The hardening material can be of many types, the defining characteristics include the fact that, within a practical period of time, the material hardens and does not crumble or otherwise significantly loose its integrity over the lifetime of the panel. Interior surfaces may crack in such a manner to further add to its "realistic" appearance, as long as the integrity is maintained so material does not fall off.

The hardenable material may be any cementitious or non-cementitious compound, preferably but not limited to gypsum cement, plaster-of-Paris or an acrylic based compound. The material chosen will once again depend on the desired final texture as well as considerations of weight, wear and costs of the project.

In a preferred embodiment an appropriate amount of gypsum cement is prepared by mixing water and gypsum cement in an approximate ratio of one part water to four parts gypsum cement, said mixture being stirred or agitated until all lumps have dissolved as shown in FIG. 5, resulting in a thick creamy consistency. The mixture is then poured into the mold cavity and spread with a tool or utensil to cover the entire surface area as shown in FIGS. 6 and 7.

The Reinforcing Means

Thirdly, a reinforcing means is placed on the wet surface and worked into the mixture. The reinforcing means serves to bind the hardenable mixture into a sheet-like material and impart flexiblity to the finished product so that the final panel is easy to manipulate and may even be used on curved surfaces. There are many synthetic or natural materials which may be used for this purpose including but not limited to burlap, glass fiber, nylon, screens or any mesh-like substance. Although panels can be made without overhang, in a preferred embodiment the reinforcing material is cut to a dimension ensuring a minimum of 10 cm overhang around the entire mold, as illustrated by 50 in FIGS. 8–12 and 14–16.

In certain designs, such as for an exterior surface, it may be preferable to attache the reinforcing means in such a manner that it is exposed surrounding each "3-dimensional face piece". This will allow a grout-type material to be filled-in after the panel is hung on a wall. Using FIG. 10 to illustrate, this would be accomplished by only filing in the protruding face pieces of the mold 11' (such as the spaces simulating brick or stone) and attaching the supporting means to the hardenable material occupying these spaces. In the example illustrated in FIG. 10, the area simulating mortar 12 would be replaced by supporting means.

Figure 8:
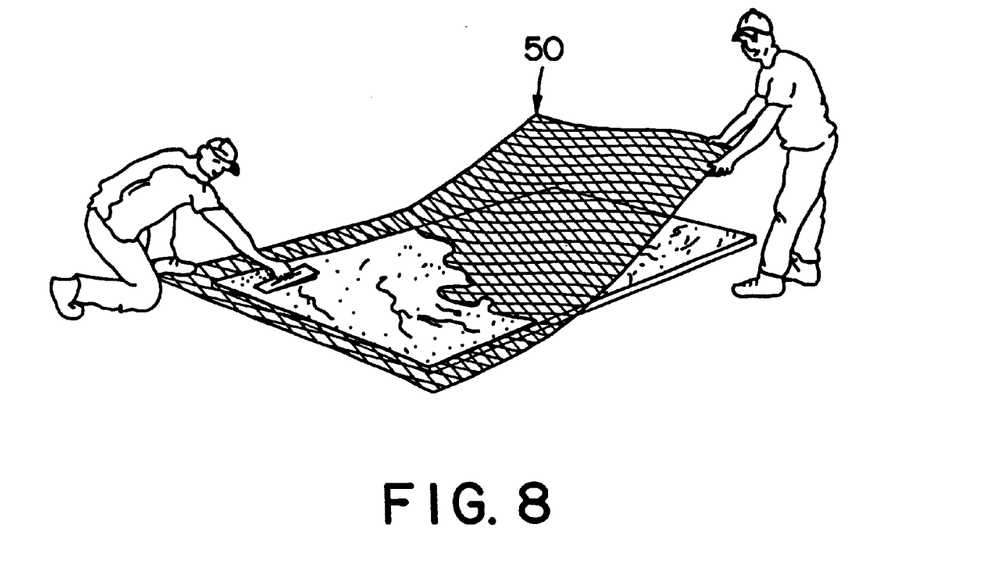
FIG. 8 illustrates how a reinforcing means can be layed over the first filling of hardenable material and then sealed into place by applying a second layer of hardenable material over the reinforcing means.
Figure 9:
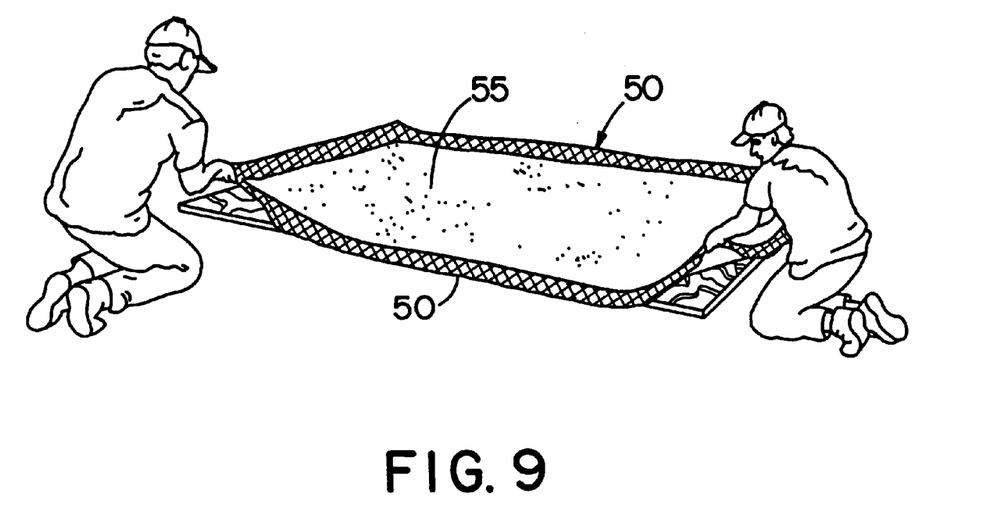
FIG. 9 shows how one type of flexible simulated-stone panel can be removed from the mold after the material has hardened by lifting the reinforcing means.
Figure 10:
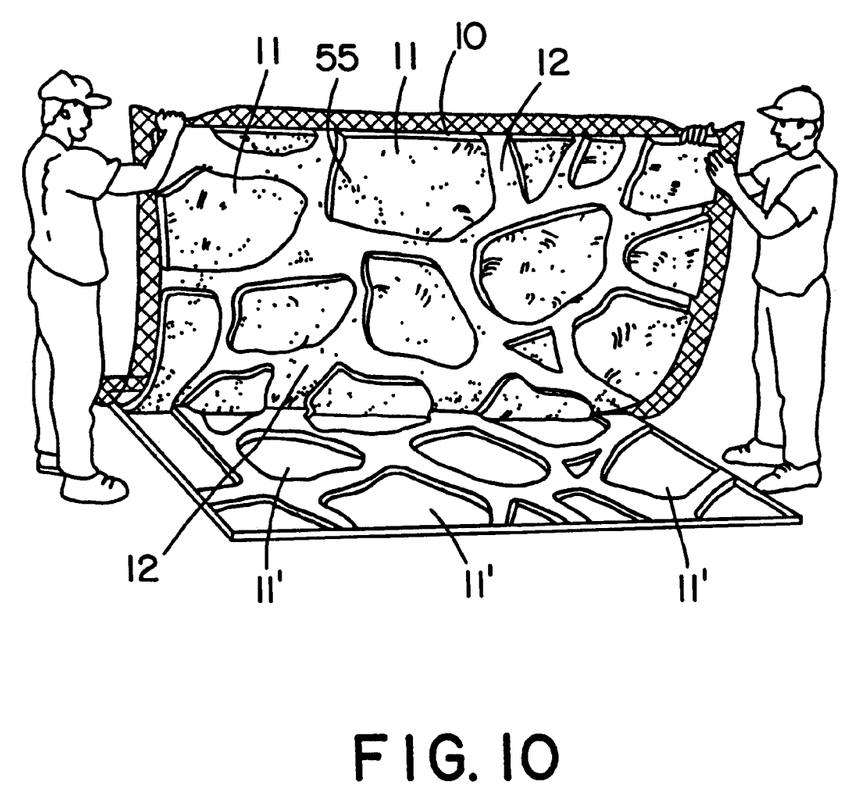
FIG. 10 illustrates one mode of separating one type of flexible panel from its mold.

In a preferred embodiment a piece of burlap 50 is used as the reinforcing agent. It is stretched over the entire surface area, leaving a 10 cm overlap on all sides, and is submerged using a whisk brush, as illustrated in FIG. 8 to smooth out the gypsum cement to an even layer throughout the cavity. One must be careful to ensure that the burlap is not submerged to the point that it will be visible on the surface of the finished product.

The Hardening Material: Backing

The backside of the panels can be generated in one or two manners, either by submerging the reinforcing means 50 sufficiently that it becomes completely covered by hardenable material 55 seeping through the spaces in the reinforcing means as shown in FIG. 8, or another layer of hardenable material can be poured on top of the reinforcing means. FIG. 8 illustrates the first method wherein sufficient hardenable material 50 has been placed into the mold to allow for complete immersion of the reinforcing means. The surface is then brushed, prior to hardening.

Demolding the Panel

Once the mixture is hard to the touch, it is ready for de-molding. A preferred embodiment of this step is demonstrated in FIG. 10, whereby the panel is lifted out of the mold by lifting the reinforcing means 50 that extends beyond the edge of the relief molded hardened material.

In the preferred embodiment the gypsum cement will take between 20–40 minutes to cure, depending on the brand used, before it is hard to the touch and de-molding can be attempted. In one embodiment the curing period after de-molding last for approximately 24 hours, depending on the brand of gypsum cement.

In embodiments where it is desired to have interlocking panels, portions of the panel 71 can be cut out using a knife 72 as demonstrated in FIG. 11. This will generate spaces 73 that can be filled in by the protruding pieces on an adjacent panel.

Figure 12:
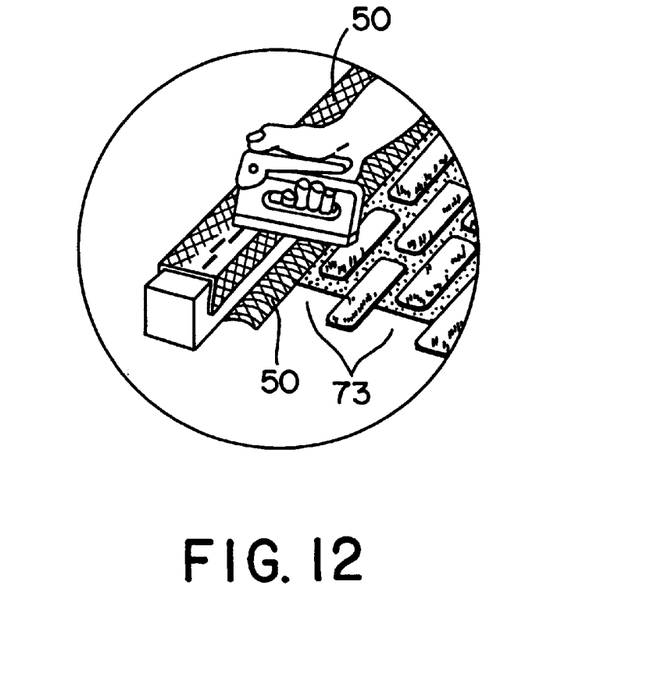
FIG. 12 shows how an supporting structure such as an elongate piece of wood can be attached to the a panel to assist in its hanging or attachment to a wall.

In one embodiment, an elongated piece of wood 85 is placed along one edge of the panel as it sits in the mold such that overhanging reinforcing member can be wrapped around the piece of wood 85 and stapled (as shown in FIG. 12), nailed, screwed or otherwise fastened to the beam. The cured sheet 55 can then be gently pried from the mold beginning with the edge that is fastened to the plywood strip. The sheet is then placed in a warm dry area for the remainder of the curing period afterwhich it will be ready for installation.

Attaching the Panel to a Surface

Figure 13:
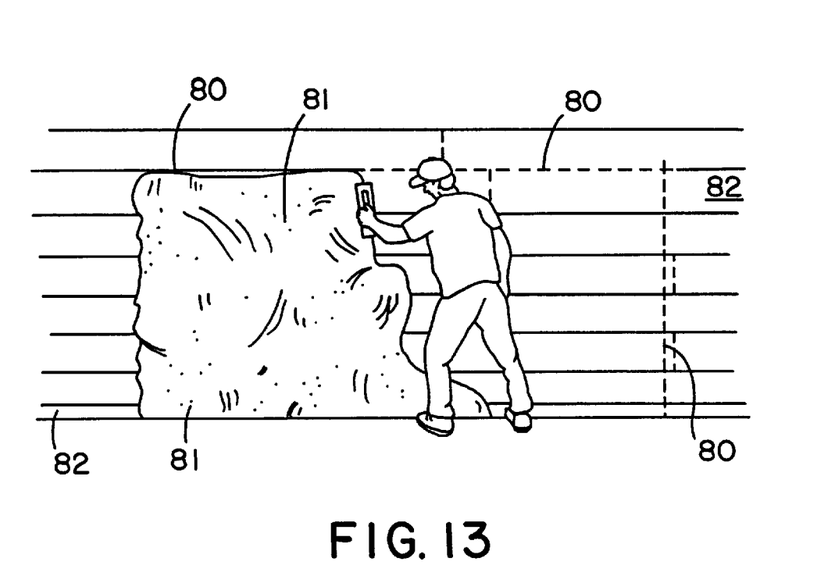
FIG. 13 a depiction showing the application of adhesive on the surface to which is applied the product of the present invention.
Figure 14:
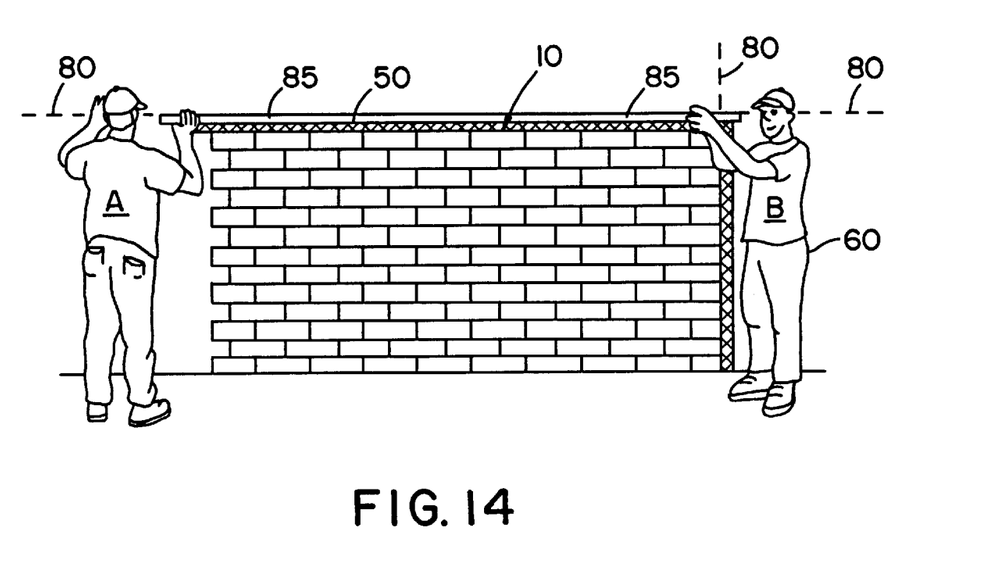
FIG. 14 illustrates how a panel can be attached to a wall using a horizontal support by screwing or nailing the support to the wall while the adhering substance dries. The dotted line represents markings that assist in proper alignment of the panels.
Figure 15:
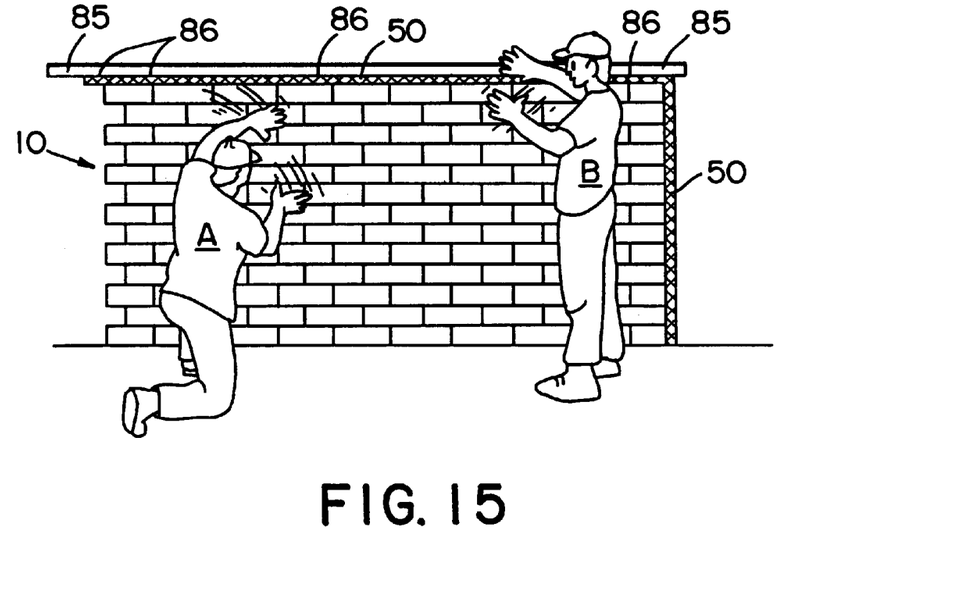
FIG. 15 shows how a panel can be pressed to the wall to maximize contact between the panel and adhesive on the receiving wall.
Figure 16:
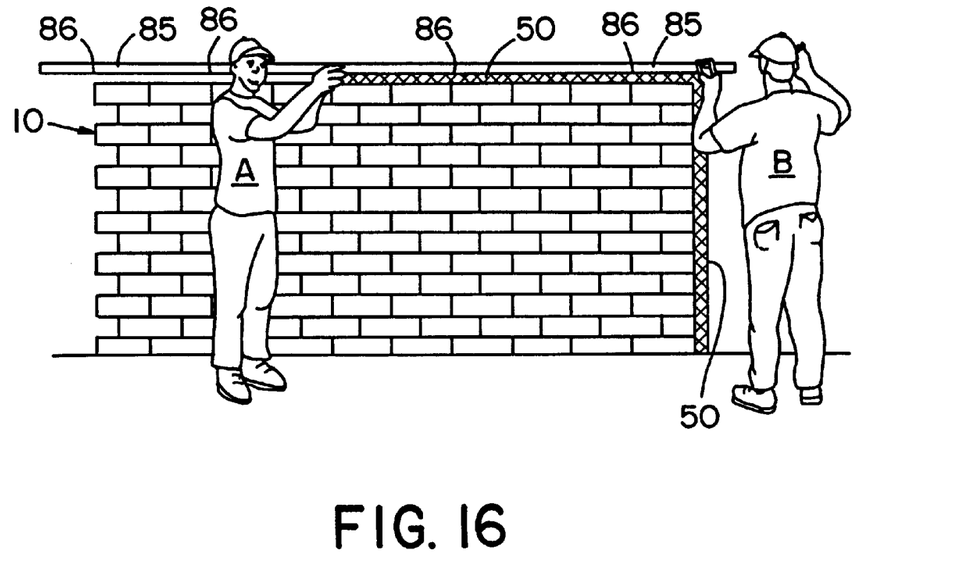
FIG. 16 demonstrates how the supporting structure and excess reinforcing means can be cut away by worker A, afterwhich worker B removes the screws or nails from the wall that were used to attach the supporting structure to the wall.

The method of attachment for one preferred embodiment includes attaching the panels to the surface using an industrial strength adhesive which spreads the adhesive force over the surface of the panel. This method is demonstrated in FIGS. 13 through 16. FIG. 13 illustrates how adhesive 81 may be applied to the surface of a wall 82 prior to attachment of the panel. Guiding lines 80 can be placed on the wall for proper alignment of the panels. FIG. 14 shows how the support beam 85 may be used to "hang" the panel 10 while the adhesive is hardening. In this figure, worker A is screwing the beam 85 to the wall. This mode of attachment is in contrast to rigid points of attachment such as nails or clips, which focuses the support to the point of attachment. Although nails or screws 86 may be used to hold the panels in place during installation, these are eventually removed as demonstrated by worker B in FIG. 16, such that no rigid spikes or screws that remain in the panel once the adhesive has set.

Supplemental Features

If spaces are left surrounding the "bricks", filler can be added after the panels are attached to the wall. This will reduce even more any "pre-fabricated" appearance. Multi-colored brick or logs filled-in with a mortar-like material will be rendered even more realistic. If the 'paint-grade' material is used, the spaces do not need to be filled in by hand.

The face of these panels can be painted to more closely simulate natural products or a wall constructed of natural products, such as brick, that has been painted.

Though not strictly considered part of this invention, foam material may be applied to the back face of the panels after this layer has hardened to provide an insulating feature to the panel.

Advantages

In general, an artificial covering that looks realistic holds many advantages over natural materials. It will be significantly more lightweight, less expensive to construct and install, more flexible, etc.

A panel manufactured in this manner has several advantages to those disclosed in the prior art. A substantial savings is achieved in the installation costs over other three dimensional decorative wall elements in that the panels produced by the present process will allow the installation of up to 36 square feet at a time. There is no requirement for special hardware nor specially formed groves or holes. The product can be cut with a simple drywall knife and installed by the average homeowner with virtually no masonry knowledge.

Yet another advantage is that the panels can be produced that are sufficiently flexible to be applied to either a flat surface, an inside curve or an outside curved, depending on the size and depth of the relief. In contrast, most panel constructions are rigid and must be applied to a flat surface. For example, a panel made of paint grade materials, being thinner and relatively flexible could be wrapped around a three foot diameter curve.

The method of manufacture is simple, economical and straightforward. Traditionally, economical pre-fabricated panels were very repetitive in design such that it is obvious that they are not real materials. However, the design of this invention allows for the creation of variability in the design not seen in low-cost decorating materials.

The resulting product is very versatile and may be used in various decorative applications. The panel may be tinted in singular or multiple colours and textured to attain different decorative effects.

Finally, the product, if made from a water-soluble material, such as an acrylic based compound, the panels will be sufficiently weather-guarded for outdoor use.

The speed of manufacture is particularly notable: for example 4×8 foot panel can be poured, set, hardened and de-molded in thirty minutes. In the appropriate high volume set-up, three people working at this rate can manufacture forty panels/day. When installed, four 4×8 ft panels would cover one 8×16 ft living room accent wall. Thus, three workers could produce sufficient paneling for an accent wall for ten living rooms or this dimension.

It is to be understood that the exemplary embodiments contained herein are illustrative and not restrictive. It will be obvious to those skilled in the art that modifications and changes may be made without departing from the true scope and spirit of the invention.

The embodiments of the invention in which an exclusive property or privilege is claimed are defined as follows:

1. A method for the manufacture of decorative panels consisting of:
   (a) filling a single cavity open tray mold, comprising a plurality of indentations in the shape of natural materials, with a fluent hardening material wherein said hardening material is selected from gypsum cement, plaster-of-Paris, or an acrylic based compound, and wherein said mold comprises a continuous pattern of a natural material or materials in relief;
   (b) totally submerging a reinforcing means within the hardening material;
   (c) brushing the surface of the hardening material to further submerge said reinforcing means; and
   (d) de-molding the hardened panel,
thereby producing a flexible panel consisting of a one piece unit of molded formations of the same material with said reinforcing means spanning the panel.

2. The method according to claim 1, wherein the reinforcing means is further submerged in the hardening material by pouring a second layer of hardening material over the reinforcing means prior to de-molding the panel.

3. The method according to claim 1, wherein said natural material is selected from the group consisting of: wood planks, logs, bricks, stones, flagstones, millwork, woodwork, shingles and any type of masonry-work.

4. The method according to claim 1, wherein the reinforcing means is selected from burlap, glass fiber, screen, jute, cloth or nylon.

5. A flexible three-dimensional panel produced by:
   (a) filling a single cavity open tray mold comprising a plurality of indentations in the shape of natural materials, with a fluent hardening material, wherein said hardening material is selected from gypsum cement, plaster-of-Paris, or an acrylic based compound, and wherein said mold comprises a continuous pattern of a natural material or materials in relief;
   (b) totally submerging a reinforcing means within the hardening material;
   (c) brushing the surface of the hardening material to further submerge said reinforcing means; and
   (d) de-molding the hardened panel,
thereby producing a flexible panel consisting of a one piece unit of molded formations of the same material with said reinforcing means spanning the panel.

6. A panel according to claim 5 wherein, after submerging the reinforcing means, said panel is produced by additionally pouring another layer of hardening material over the reinforcing means.

7. A kit to produce a flexible panel in relief consisting of:
   (a) a single cavity open tray mold comprising a plurality of indentations in the shape of natural materials;
   (b) an appropriate amount of hardening material selected from gypsum cement, plaster-of-Paris, or an acrylic based compound, to fill the mold a predictable number of times to generate a set number of panels;
   (c) an appropriate quantity and size of reinforcing means that can span said mold a predictable number of times to generate a set number of panels, wherein said reinforcing means is to be submerged within the hardening material; and
   (d) instructions for preparing a flexible decorative panel according to the method of claim 1.

8. A kit according to claim 7, wherein the kit comprises substances to generate said hardening material.

* * * * *